May 21, 1957    A. J. MONCRIEFF-YEATES ET AL    2,792,752
METHOD OF AND MEANS FOR CONTROLLING LIGHT
Filed July 1, 1953      2 Sheets-Sheet 1
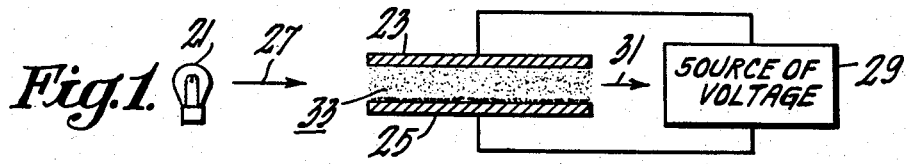
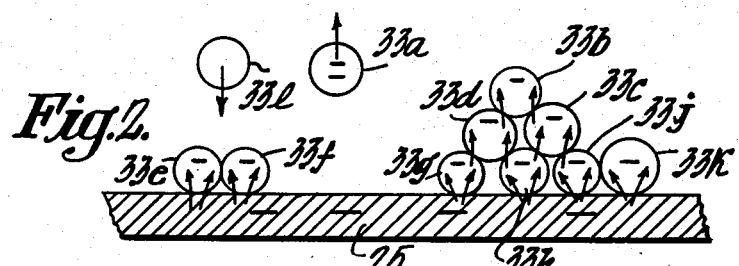
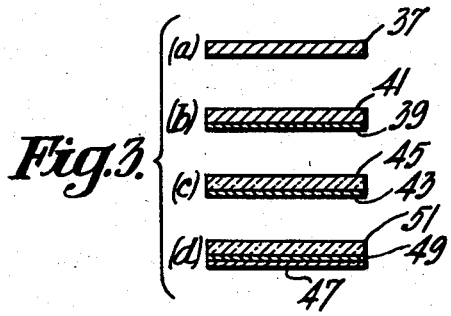
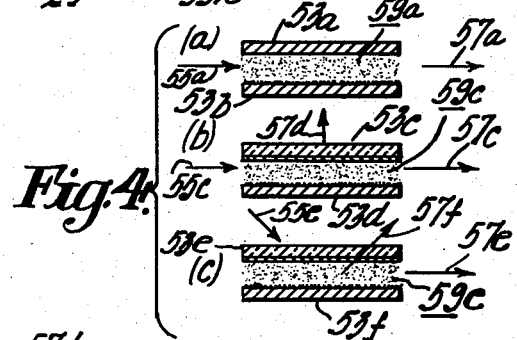
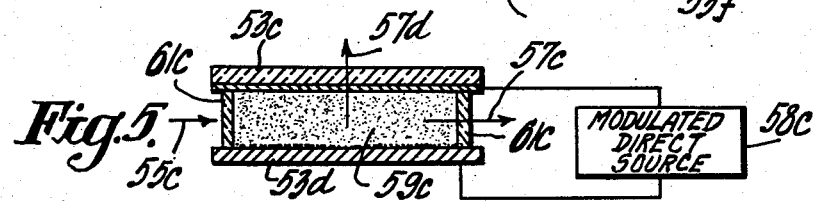
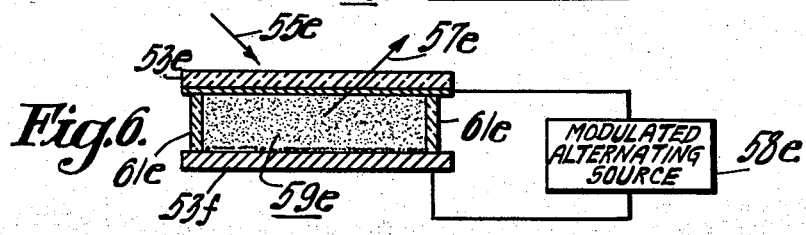
INVENTORS
ALEXANDER J. MONCRIEFF-YEATES
& MEYER L. SUGARMAN, JR.
BY
ATTORNEY

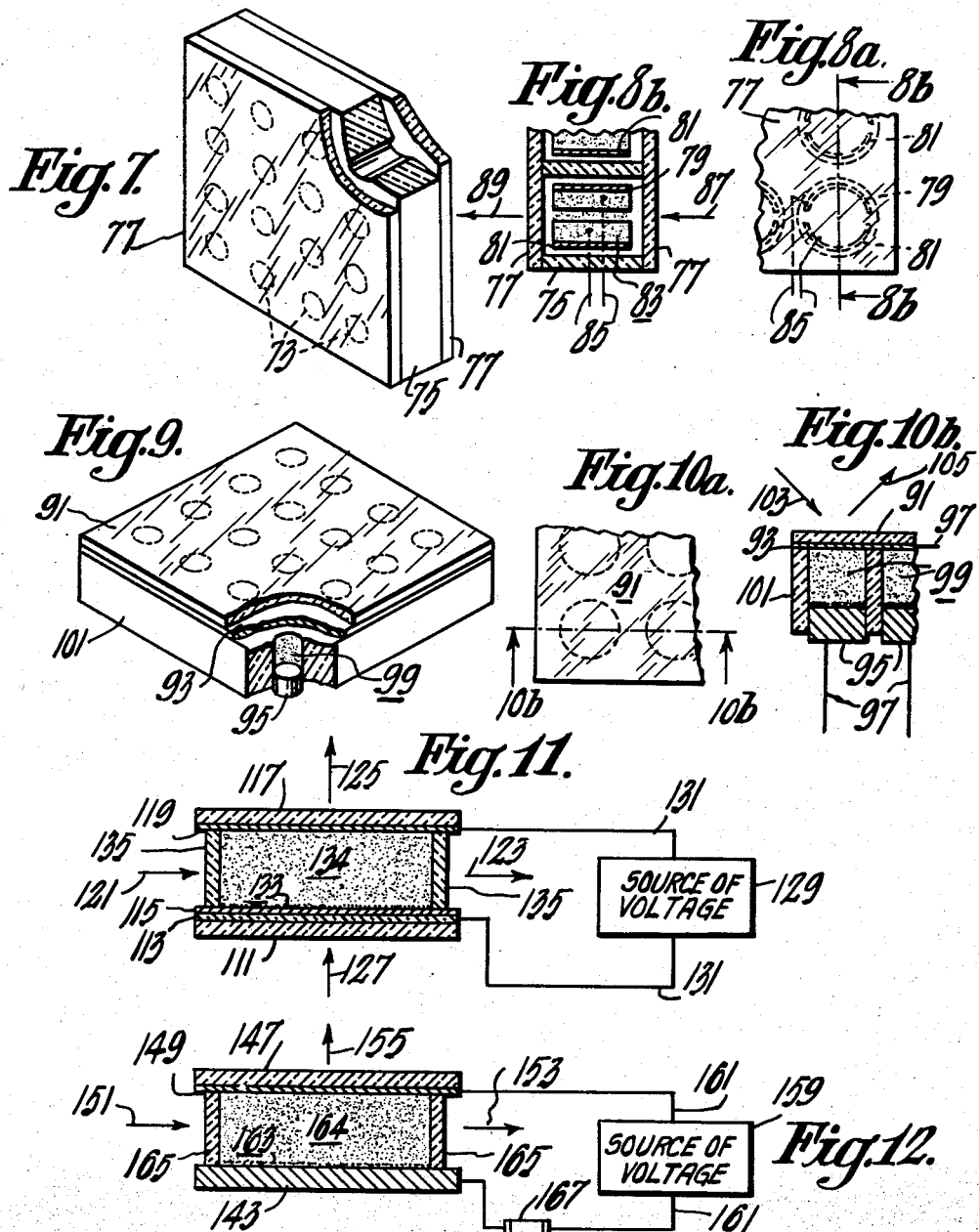

United States Patent Office 2,792,752
Patented May 21, 1957

2,792,752
METHOD OF AND MEANS FOR CONTROLLING LIGHT

Alexander J. Moncrieff-Yeates, Princeton Junction, and Meyer L. Sugarman, Jr., Princeton, N. J., assignors to Radio Corporation of America, a corporation of Delaware Application July 1, 1953, Serial No. 365,456

17 Claims. (Cl. 88—61)

This invention relates to a method of and means for controlling light and more particularly to a novel method of and means for varying the intensity of a beam of light.

Many ingenious schemes and devices for varying the intensity of a light beam have disadvantages. The devices which have the fastest speeds of response usually employ some electrical means to vary the light intensity. Each requires some special material in some very carefully controlled environment in order to accomplish its object. For example, some devices require a polarized light beam to pass through a medium which will rotate the plane of polarization of the light when an electric field is applied to the medium. Others require a light beam to pass through a liquid medium having specially shaped particles of a special composition therein which will align themselves to obstruct the passage of light when an electric field is applied.

It is an object of this invention to provide novel methods of and means for controlling the intensity of a light beam by electrical means.

Another object of this invention is to provide new and improved methods of and means for modulating the intensity of a beam of light by electrical means.

A further object of this invention is to provide a simplified light valve that operates by electrical means.

Another object of this invention is to provide novel and improved methods of and means for amplifying a light beam.

A further object of this invention is to provide a novel kinescope.

Another object of this invention is to provide new and improved methods of and means for producing an image which may be projected upon a screen.

In general, the method of this invention comprises forming a powder cloud by alternately charging and discharging a plurality of powder particles in an electric field, the density of said cloud being a function of the strength of said electric field and the rate of charging and discharging said powder particles, and passing a light beam into said cloud thereby selectively intercepting said light beam. A light controlling device incorporating the present invention comprises at least two spaced electrodes, a powder between said electrodes, and connection means for a source of voltage for producing an electric field between said electrodes to establish a powder cloud. A light beam directed into a cloud formed by the field between these electrodes may be transmitted through, reflected by, or absorbed by the said cloud, to produce component beams that are functions of the field intensity between said electrodes, within a determinable range of field intensities.

The various embodiments and features of this invention will be described in detail hereinafter by reference to the accompanying drawings of which:

Figure 1 is a sectional view of a simple embodiment of this invention;

Figure 2 is an enlarged sectional view of the lower electrode illustrated in Figure 1;

Figures 3(a), 3(b), 3(c) and 3(d) are elevational sectional views of several types of electrode structures;

Figures 4(a), 4(b), and 4(c) are elevational sectional views of several types of cell arrangements;

Figure 5 is an elevational sectional view of one type of light valve incorporating the present invention;

Figure 6 is an elevational sectional view of another type of light valve incorporating the present invention;

Figure 7 illustrates a cutaway isometric view of a block of cells arranged as a portion of a kinescope;

Figure 8a is a plan view and 8b is a sectional view of a light valve cell used in a kinescope of the type illustrated in Figure 7;

Figures 9 illustrates a cutaway isometric view of a block of cells arranged as a portion of a kinescope;

Figure 10a is a plan view and 10b is a sectional view of a light valve cell used in a kinescope of the type illustrated in Figure 9;

Figure 11 is an elevational sectional view of a light beam amplifier incorporating the present invention; and, Figure 12 is an elevational sectional view of another type of light beam amplifier incorporating the present invention.

Similar reference characters are applied to similar elements throughout the drawings.

Figure 1 illustrates a simple form of the apparatus for explaining the principles of operation of this invention. A source of light 21 provides a substantially collimated input beam 27 between an upper electrode 23 and a lower electrode 25. A layer of powder of a suitable material lies on the surface of the lower electrode 25. When an electric potential from a source 29 is applied to establish a field between the electrodes 23 and 25, the powder forms a cloud 33 between said electrodes, reflecting or absorbing part or all of the beam 27 to produce an output beam 31. As the potential difference applied to the electrodes 23 and 25 is increased, the cloud becomes more dense. When the potential is reduced, the cloud becomes less dense. Thus, the output beam 31 becomes dimmer or brighter depending upon the potential applied to the electrodes 23 and 25. Almost any substance in powdered form can be used.

Referring to Figure 2, powder grains 33b through 33k are shown resting on the electrode 25 or upon one another. When a negative charge is applied to the electrode 25, a negative charge moves up from the electrode 25 into the powder grains through the points of contact with the electrode or with other grains, as shown by the arrows. The grains 33 become negatively charged and attracted to the upper electrode which is more positively charged. When the electric forces pulling upward on a grain are sufficient to overcome the forces acting downward, principally gravity, the powder grain will move to the upper electrode 23. A grain 33a is shown in a position of moving to the upper electrode. When the grain reaches the upper electrode, it discharges its negative charge to the upper electrode and downward forces return the grain to the lower electrode. A grain 33l is shown in a position of moving back to the lower electrode. Each powder grain may be considered as being a charged particle acting in an electric field. The strength of the electric field is a function of the voltage differential and the distance between the electrodes. Since gravity is the principal downward force acting on each particle, the approximate minimum voltage necessary to lift a particle is given by the expression:

$$V = 470 d \sqrt{ap}$$

where: $V$=potential difference applied to the electrodes in volts, $d$=spacing between the electrodes in centimeters, $p$=density of particle in grams per cubic centimeters, and
$a$=diameter of the particle in microns. Higher voltage ranges produce better results; however, too high a voltage will cause arcing between the electrodes. The above equation applies to particle diameters within the range from .001 to 0.25 centimeter. Voltages producing fields of the order of 2000 volts per centimeter are quite successful with most powders.

The powder selected may be made of a material that has a low electrical resistivity. In this case, the charge on the lower electrode distributes itself through the powder and the powder moves away from the lower electrode very rapidly. On striking the upper electrode, the powder grains give up their charge very rapidly and may even become positively charged before commencing to return to the lower electrode.

Alternatively, the powder selected may be made of a material that has an intermediate or a high resistivity. The higher the resistivity of the powder, the slower the rate of charging of the powder grains and the slower the rate of distribution of charge through the powder mass on the lower electrode. The rate may be so slow that a bottom grain, for example, 33$h$ in Figure 2 may build up a sufficient charge to burst through the grains 33$b$, 33$c$ and 33$d$ above it, before the grains above become sufficiently charged to move. When the grains reach the upper plate, they discharge at a rate that is proportional to their rate of charging.

It can be seen, therefore, that the lower the resistivity of the powder, the faster the powder will respond to the applied potential on the electrodes and the greater the number of trips between electrodes for each grain per unit of time. Another factor affecting the speed of response of a powder grain is the size of the grain and the density of the material since heavier particles require greater charges to move them. Hence, a wide variety of speeds of response may be obtained by proper selection of the powder and grain size.

While the description has been confined to a negative potential applied to the lower electrode and a positive potential applied to the upper electrode, the polarity may be reversed and the lower electrode may be positively charged. It is sufficient to have a potential difference between the upper and lower electrodes, in order to establish an electric field. An alternating current potential may be applied to the electrodes. Powders will respond to electric field established by alternating or pulsating potentials at least through the audio range of frequencies. The highest frequency to which a powder responds depends in part on the electrical resistivity of the powder and the applied voltage. The lower the resistivity and the higher the voltage the higher the frequency to which the powder will respond. This may be explained as follows: In an ordinary cycle a powder grain becomes charged, moves upward, discharges and moves back. Since a powder grain having a higher resistivity takes longer to charge and to discharge, the period of time for one cycle will be longer. The highest frequency to which a powder grain will ordinarily respond will depend upon the period of time it takes the grain to complete one cycle, that is, the time it takes the grain to acquire a charge, move to the upper electrode, discharge, and return to the lower electrode. The size of the grain and the density of the grain material affects the highest frequency of response, in that a heavier grain takes a greater charge to move it, and in that a heavier grain moves more slowly between the electrodes. Hence the heavier the grain the longer the minimum period of time for one cycle, and the lower the highest frequency to which the grain will ordinarily respond. Some other factors that affect frequency of response are the resistivity of the powder material and magnitude of the applied voltage, since these factors affect the rate at which a grain acquires a charge. It should be noted that surface effects may interfere with the operation of this invention if the powder grains are colloidal size.

A grain in transit between the electrodes, may respond to higher frequencies than the above-mentioned frequencies. One explanation is that when a grain is moving toward one electrode, the reverse half cycle can, at most, reduce its velocity to zero. The next half cycle will start the grain on its way again. At certain frequencies, this process may be repeated many times a second to maintain the powder cloud.

The powder may also be selected for its ability to absorb or reflect light. A darker colored and matte-finished powder will tend to absorb a high percentage of the light that strikes it. The lighter colored powders will reflect large percentages of the incident light. Powders having one or the other of these properties may be preferred for particular application as will be explained hereinafter. Mixtures of two or more powders may be used.

A list of some powders that have been used successfully follows. Some conducting powders are brass, zinc, graphite, and acetylene carbon black. Some semi-conducting powders are sodium chloride, magnesium silicate, barium carbonate, talc, bentonite, magnesium oxide, and kaolin. Some insulators are glass beads, nylon, sulphur, sawdust, agar-agar and phenol formaldehyde and other synthetic resins.

Some light reflecting powders are brass, sodium chloride, magnesium silicate, and nylon. Some light absorbing powders are zinc, graphite, and bentonite.

Referring now to Figure 3, the electrodes may be any material which will impart a charge to powder grains that are in contact with the electrode. The electrode may be a solid conductor 37, such as copper, as shown in Figure 3$a$. It may be a layer of a conductor or semiconductor 39 on a suitable backing 41 as shown in Figure 3$b$. The electrode may be an optically-transparent, electrically-conducting layer 43 on an optically-transparent backing 45 as shown in Figure 3$c$. As shown in Figure 3$d$, it may be an optically transparent, electrically-conducting layer 49 on an optically transparent backing 51 with a photoconductive layer 47 superimposed on the conducting layer 49. The electrodes may be any shape, for example, flat, curved or spherical. If the electrode curvature is selected properly, the powder between the electrodes can be focused, thus obviating the need for walls to contain the powder. However, generally, the electrodes in the embodiments of the invention described herein are all flat plates and all require means to contain the powder. The electrodes in one device may have the same structure or may be combinations of different structures and shapes.

The light source 21 of Figure 1, need only provide a substantially collimated beam of light. The light may be visible, infrared, ultra violet, or any other form of electromagnetic wave energy.

As shown in Figure 4, several electrode arrangements are possible using a pair of flat plates in spaced parallel relation. If the electrodes are opaque as in Figure 4$a$, the light source must direct an input light beam 55$a$ into a powder cloud 59$a$ between the electrodes 53$a$ and 53$b$ and only an output beam 57$a$ may be used. Figure 4$b$ shows a lower opaque electrode 53$d$ and an upper transparent or translucent electrode 53$c$. An input light beam 55$c$ passing between said electrodes strikes a cloud of reflecting powder 59$c$ disposed between a pair of spaced electrodes 53$c$ and 53$d$ allowing an output beam 57$c$ to pass through as above described and also producing a reflected output beam 57$d$ which passes through the upper electrode 53$c$. Figure 4$c$ shows the same arrangement illustrated in Figure 4$b$, only an input light beam 55$e$ shines from above through a transparent electrode 53$e$ striking a cloud of reflecting powder 59$e$ disposed between a pair of spaced electrodes 53$e$ and 53$f$ producing reflected beams 57$e$, which passes between said electrodes, and 57$f$ which passes upward through upper electrode 53$e$.

Any convenient source of electric potential may be used to obtain the voltage applied to the electrodes. The source of electric potential applied to the electrodes may be controlled manually, or by a radio or television receiver, or by a photocell. In one embodiment, the potential may be controlled by light shining on a photoconductive layer on the face of the lower electrode.

The embodiments and modifications of the invention described herein may be employed as light valves, light beam splitters, light amplifiers, or in kinescopes, or in image projectors.

LIGHT-VALVE OR LIGHT-SPLITTER

Example 1

Referring to Figure 5, a pair of flat spaced electrodes 53c and 53d are arranged according to Figure 4b. The lower electrode 53d being opaque, such as is illustrated in Figure 3a or 3b; and the upper electrode 53c being transparent or translucent, as illustrated in Figure 3c. Transparent spacers 61c close the ends between said electrodes. A small quantity of magnesium silicate, milled so that 50% passes 325 mesh, rests on the upper side of lower electrode 53d. A source of light shines a substantially collimated input light beam 55c between the upper and lower electrodes 53c and 53d. The electrodes are connected to a source of modulated direct voltage 58c. The applied voltage establishes an electric field which causes the magnesium silicate particles to oscillate between said electrodes forming a powder cloud 59c whose density varies according to the applied voltage differential. The input light beam 55c is partly reflected by magnesium silicate particles 59c oscillating between the electrodes producing a reflected output light beam 57d which is approximately proportional to the applied voltage, and a transmitted output light beam 57c which is approximately inversely proportional to the applied voltage. For electrodes that are approximately 5 centimeters long and about 4 centimeters wide spaced about 0.3 centimeter apart, magnesium silicate powder will oscillate within the range of about 150 and 4000 volts. The optimum range is between 300 and 3000 volts. Maximum interception of beam 55c by the powder cloud 59c is obtained just before the breakdown voltage between the electrodes. For the above-described example this voltage is about 4000 volts. Beams 57c and 57d may be observed directly or may be projected on to a screen.

This arrangement may also be used as a light beam splitter. By selecting the powder and voltage properly, a desired fraction of a light beam may be separated from the main beam, one beam being reflected upward and the other beam transmitted. One may also use an opaque upper electrode and a light absorbent powder. The powder cloud would allow an output 57c to pass through and would absorb the balance of the input beam 55c.

Example 2

Referring to Figure 6, a pair of flat spaced electrodes 53e and 53f are arranged according to Figure 4c, the lower electrode 53f being opaque such as illustrated in Figures 3a and 3b, and the upper electrode 53e being transparent as illustrated in Figure 3c. Spacers 61e close the ends between said electrodes. Spacers 61e may be matte black on their insides. A small quantity of finely powdered brass rests on the upper side of lower electrode 53f. A source of light provides a substantially collimated input light beam 55e from above upper electrode 53e to the space between said electrodes. The electrodes are connected to a source of modulated alternating current voltage 58e. The applied voltage causes the brass particles to oscillate between said electrodes forming a powder cloud 59e whose density varies according to the applied voltage. Part or all of the input light beam 55e is reflected by the particles between said electrodes producing a reflected beam, 57e. The part of the input light beam 55e that is reflected is approximately proportional to the applied voltage. The balance of the incident beam is absorbed in the matte black walls of the inside of the cell. For electrodes that are approximately 5 centimeters long and about 5 centimeters wide spaced about 0.3 centimeters apart, brass powder will oscillate between the electrodes within the range of about 200 and 4000 volts. The optimum range is about 300 and 3000 volts. Maximum reflection of input light beam 55e by powder cloud 59e is obtained at a voltage just below the breakdown voltage between the electrodes. For the example described this voltage is about 4000 volts.

KINESCOPE

A direct view or projection type kinescope may be constructed by placing a plurality of light valves in a single block and by controlling each valve separately. Each valve produces an increment of an image.

Example 3

Referring to Figures 7, 8a and 8b, the block comprises a solid sheet 75, and it has a plurality of apertures 73 therethrough. Transparent plates 77 cover the front and back surfaces of sheet 75. An upper electrode 79 and a lower electrode 81 are located on the inner wall of each hole. A powder having a strong light absorption, such as carbon, is placed between the electrodes. The electrodes 79 and 81 are connected to a source of modulated voltage through leads 85 and a suitable switching means (not shown). The switching means may take any one of many forms; for example, it may be mechanical, or may be a cathode ray scanning a mosaic.

A substantially collimated input light beam 87, irradiating one side of the cell block, will be modulated by a powder cloud 83 produced in each cell, according to the applied voltage. This produces a plurality of modulated light beams 89, each modulated beam comprising an increment of an image. This image may be projected or it may be observed directly and therefore may be used in a direct view or projection type kinescope. This type of device must be maintained in a vertical position in order to maintain the powder cloud 83 between the electrodes 79 and 81.

Example 4

Referring to Figures 9, 10a and 10b, a block has a number of light valves. The block comprises a solid sheet 101 including a plurality of orifices. A solid, electrically conducting plug 95 closes one side of each orifice. The other side of the block is covered by an optically transparent plate 91 that is coated on the inside surface with an optically transparent, electrically-conducting coating 93. The electrodes for each cell therefore comprise the plug 95 and the coating 93, the coating 93 being common to each cell. A small quantity of highly reflecting powder, such as brass, is placed in each cell. The electrodes 93 and 95 are connected to a source of modulated voltage through leads 97 and a suitable switching means (not shown) as described in Example 3.

A substantially collimated input light beam 103 projected through the upper electrode 91 will be reflected and modulated by the powder cloud 99 produced in each cell in response to the applied voltage, providing a plurality of reflected and modulated output light beams 105, each modulated beam comprising an increment of an image. This image may be projected or observed directly for use in a direct view or projection type of kinescope. This type of kinescope-projector must be maintained in a horizontal position in order to maintain the powder cloud 99 between electrodes 93 and 95.

The cell block described in Example 4 may also comprise the face of a cathode ray tube. According to this arrangement the cathode ray scans the conducting plugs 95 to produce the modulating voltage for each cell.

LIGHT BEAM AMPLIFIER

Example 5

Referring to Figure 11, a light beam amplifier includes an upper electrode which comprises an optically transparent backing 117 with an optically transparent, electrically-conducting layer 119 on its bottom face. A lower electrode comprises a transparent backing 111 with an optically transparent, electrically-conducting layer 113 on its upper face and a photoconductive layer 115 upon the coating 113. Photoconductive layers which operate satisfactorily comprise amorphous selenium, antimony trisulphide and cadmium sulphide. Leads 131 connect coatings 119 and 113 to a voltage source 129. A powder 133 rests on said lower electrode and optically transparent spaces 135 close the ends of the cell between the electrodes. A substantially collimated input light beam 121 is directed between the upper and lower electrodes in a manner to provide minimum illumination of the photoconductive layer 115 from above.

A control light beam 127 to be amplified irradiates the photoconductive layer 115 from below, causing a charge to form on the upper surface of the photoconductive layer 115, thus forming a cloud of powder 134. The powder cloud controls the intensity of the transmitted output light beam 123, derived from the input beam 121, said intensity being approximately inversely proportional to the light intensity of the control beam 127 which is to be amplified. The cloud also provides a reflected output light beam 125, also derived from beam 121, which passes upward through the upper electrode 119 and the intensity of which is approximately proportional to the light intensity of the control light beam 127. Since very small light intensities of the control light beam 127 can control very large intensities of the output beams 123 and 125, large amplification of the control light beam is effectively obtained. If desired, the photoconductive layer may also be located on the inner face of the upper electrode.

Another variation of this same idea is to substitute a photoconductive powder for the powder 133 and the layer 115 in the above example. Some photoconductive powders which are suitable are amorphous selenium, cadmium sulphide, antimony trisulphide and lead iodide.

Example 6

Referring to Figure 12, a light valve of the type shown in Figure 5 includes a solid electrode 143 and an upper electrode comprising an optically-transparent backing 147 with an optically-transparent electrically-conducting layer 149 on its lower face. The electrode 143 and the layer 149 are connected through a photoconductive photocell 167 to a source of a voltage 159. Transparent spacers 165 close the space between the electrodes 143 and 149. A control light beam 157 to be amplified irradiates the photocell 167, which controls the voltage differential between electrodes 143 and 149. The voltage differential provides an electric field to establish a powder cloud 164 which splits an input light beam 151 directed at said cloud into a transmitted output light beam 153 and a reflected output light beam 155 which is reflected upwardly through the transparent electrode 149. Effective light amplifications of more than a million to one may be obtained with this arrangement. Any photocell will work.

There have thus been described novel and unique methods and means employing a variable density powder cloud responsive to an electric field for controlling the intensity of a light beam. Among the applications to which these methods and means may be applied are novel light valves, beam splitters, kinescopes, projectors and light beam amplifiers.

What is claimed is:

1. The method of controlling the intensity of a light beam which comprises forming a powder cloud by alternately charging and discharging a plurality of powder particles in an electric field, the density of said cloud being a function of the strength of said electric field and the rate of charging and discharging of said powder particles, projecting said light beam into said cloud to selectively control said light beam, and deriving a controlled beam from said cloud.

2. The method of controlling the intensity of a substantially collimated beam of light which comprises establishing an electric field, passing said beam into a powder cloud in said electric field the particles of said powder cloud being alternately charged and discharged, and varying the density of said cloud by varying the strength of said electric field and the rate of charging and discharging of said powder particles.

3. A light valve comprising at least two spaced electrodes, a powder between said electrodes, connection means for a source of voltage for producing an electric field between said electrodes to establish a powder cloud, means for introducing a light beam into said cloud, and means for deriving controlled light from said space.

4. The device of claim 3 wherein at least one of said electrodes is light-transmitting.

5. The device of claim 3 wherein at least one of said electrodes has a coating of a photoconductive material on its inner surface.

6. The device of claim 3 wherein said connection means includes a photocell.

7. The device of claim 3 wherein one of said electrodes is optically transparent and has a photoconductive layer on its upper surface.

8. The device of claim 3 wherein said powder is finely powdered zinc, said electrodes are metal plates spaced of the order of one centimeter apart and means connected to said connection means providing a voltage between about 600 and 12,000 volts.

9. A light valve comprising a lower electrode, an upper optically-transparent electrode spaced from said lower electrode, a powder between said electrodes, connection means for a source of voltage for producing an electric field between said electrodes to establish a powder cloud, means for introducing a light beam into said cloud, and means for deriving controlled light from said space.

10. The device of claim 9 wherein said powder is finely powdered magnesium silicate, said lower electrode is a metal plate, said upper electrode is a glass plate having a transparent electrically-conductive coating on its lower face.

11. A light valve comprising a lower electrode, an upper optically-transparent electrode spaced from said lower electrode, a reflective powder between said electrodes, connection means for a source of voltage coupled to said electrodes for producing a voltage differential between said electrodes, means directing a light beam between said electrodes, and means for deriving a controlled light from said space.

12. The device of claim 11 wherein said powder is finely powdered magnesium silicate, said electrodes are spaced about one centimeter apart and means connected to said connection means providing a voltage between 600 and 12,000 volts.

13. A light beam splitter comprising a lower electrode, an upper optically-transparent electrode spaced from said lower electrode, a light reflective powder between said electrodes, connection means for a source of voltage, said means being coupled to said electrodes for establishing an electric field between said electrodes for producing a cloud of said powder, and means for directing a beam of light transversely through said cloud whereby a portion of said light beam passing between said electrodes is reflected through said upper electrode.

14. A light valve comprising a lower electrode, an upper electrode spaced from said lower electrode, a light absorptive powder between said electrodes, connection means for a source of voltage coupled to said electrodes for establishing an electric field between said electrodes for producing a cloud of said powder, and means directing a beam of light through said cloud whereby a portion of said light beam passing between said electrodes is absorbed, said absorbed portion being a function of the voltage differential between said electrodes.

15. A light beam amplifier comprising an upper electrode, a lower optically-transparent electrode having a photoconductive layer on its upper surface spaced from said upper electrode, a powder between said electrodes connecting means for a source of voltage coupled to said electrodes for producing an electric field between said electrodes, and means directing a beam of light through said cloud and means for deriving controlled light from said space.

16. An image producing device comprising a plurality of light valves in a single block each valve producing an increment of an image, each valve comprising an upper optically-transparent electrode, a lower electrode spaced from said upper electrode, a reflective powder therebetween, means for directing a substantially collimated beam of light through the upper electrode of each valve, connection means for a source of voltage coupled to the electrodes of each valve for establishing an electric field for producing a cloud of said powder between the electrodes in each of said valves whereby said powder cloud in each cell reflects an amount of the light beam passing into said cell that is a function of the strength of said electric field.

17. An image producing device comprising a plurality of light valves in a single block each valve producing an increment of an image, each valve comprising a pair of spaced electrodes, a light absorptive powder therebetween, means for directing a substantially collimated light beam through each valve, connection means for a source of voltage coupled to the electrodes of each valve for establishing an electric field for producing a cloud of said powder between the electrodes in each of said valves whereby said powder cloud in each cell absorbs an amount of the light beam passing therethrough that is a function of the strength of said electric field.

References Cited in the file of this patent
UNITED STATES PATENTS

| | | |
|---|---|---|
| 1,724,298 | Miller | Aug. 13, 1929 |
| 1,773,980 | Farnsworth | Aug. 26, 1930 |
| 1,792,752 | Michelssen | Feb. 17, 1931 |
| 1,814,843 | Narath | July 14, 1931 |
| 1,835,612 | Pearson | Dec. 8, 1931 |
| 2,573,881 | Walkup et al. | Nov. 6, 1951 |